United States Patent [19]

Nachbur et al.

[11] 3,903,336
[45] Sept. 2, 1975

[54] USE OF PHOSPHORUS-CONTAINING CONDENSATION PRODUCTS AS FLAMEPROOFING AGENTS FOR FIBRE MIXTURES OF POLYESTER AND CELLULOSE

[75] Inventors: Hermann Nachbur, Dornach; Arthur Maeder, Therwil, both of Switzerland

[73] Assignee: Ciba-Geigy AG, Basel, Switzerland

[22] Filed: Aug. 31, 1972

[21] Appl. No.: 285,150

[30] Foreign Application Priority Data
Sept. 10, 1971 Switzerland.................. 13306/71

[52] U.S. Cl............ 427/381; 260/606.5 P; 427/390
[51] Int. Cl.² .... C09D 1/00; C09D 3/52; C09D 5/18
[58] Field of Search ...... 117/138.8 F, 139.5 A, 136, 117/143 A; 260/606.5 P

[56] References Cited
UNITED STATES PATENTS
2,809,941   10/1957   Reeves et al............................ 260/2

FOREIGN PATENTS OR APPLICATIONS
884,785   12/1961   United Kingdom
22,438   11/1967   Japan

OTHER PUBLICATIONS

*Proban, Durable Anti–Flame Finish for Fabrics*, Fibres (Engineering and Chemistry), December 1957, pp. 400, 401.

*Primary Examiner*—Michael R. Lusignan
*Attorney, Agent, or Firm*—Joseph G. Kolodny; Prabodh I. Almaula; Edward McC. Roberts

[57] ABSTRACT

The subject of the invention is the use of watersoluble condensation products of (a) 1 mol of a tetrakis-(hydroxy-methyl)-phosphonium compound and (b) 0.02 to 1 mol, preferably 0.2 to 1 mol or especially 0.3 to 0.6 mol, of methylolated urea or its alkyl-ethers, preferably dimethylolurea, as flameproofing agents for fibre mixtures of polyester and cellulose.

16 Claims, No Drawings

USE OF PHOSPHORUS-CONTAINING CONDENSATION PRODUCTS AS FLAMEPROOFING AGENTS FOR FIBRE MIXTURES OF POLYESTER AND CELLULOSE

The subject of the invention is the use of water-soluble condensation products of (a) 1 mol of a tetrakis-(hydroxy-methyl)-phosphonium compound and (b) 0.02 to 1 mol, preferably 0.2 to 1 mol or especially 0.3 to 0.6 mol, of methylolated urea or its alkyl-ethers, preferably dimethylolurea, as flameproofing agents for fibre mixtures of polyester and cellulose.

The water-soluble condensation products are obtained by condensing the components (a) and (b) at 40° to 120°C, optionally in the presence of an inert organic solvent.

The component (b) can also be introduced into the reaction as a mixture of urea and formaldehyde or a formaldehyde-releasing agent. The molar figures of 0.02 to 1 mol for component (b) indicate, with regard to the lower limit of 0.02, a value which is preferably not reached. The preferred values are between 0.2 and 1, say, for example, 0.3 or 0.6.

The condensation can preferably be carried out at 70° to 110°C in the presence of an inert organic solvent or solvent mixture or in an aqueous medium. Aromatic hydrocarbons are above all suitable, such as, for example, toluene, o-, m- or p-xylene or a mixture thereof, or xylene, toluene, xylene-benzene or xylene-decahydronaphthalene mixtures.

At the same time it is, however, also possible to carry out the condensation in the absence of an inert organic solvent, for example by using, as the solvent, a condensation product which has already been produced, or carrying out condensation in the melt.

An appropriate procedure is to heat the tetrakis-(hydroxymethyl)-phosphonium compound, which as a rule is present as an aqueous solution, to the boil together with the component (b), optionally in a solvent, and to distill off the water.

Suitable tetrakis-(hydroxymethyl)-phosphonium salts are, for example, the formate, acetate, phosphate or sulphate and the halides, such as, for example, the bromide or especially the chloride. Tetrakis-(hydroxymethyl)-phosphonium chloride is hereafter referred to as THPC.

Where Tetrakis-(hydroxymethyl)-phosphonium hydroxide (THPOH) is used as the starting product, it is appropriately prepared beforehand from a corresponding salt, for example THPC, by neutralisation in aqueous solution with a base, for example sodium hydroxide, and subsequent dehydration.

Amongst the methylolated urea compounds, dimethylolurea is particularly suitable. If the methylolated urea compounds are only prepared during the condensation, the formaldehyde is present as an aqueous solution. Paraformaldehyde is particularly suitable as a formaldehyde-donating agent.

The acid catalysts optionally used conjointly in the condensation are preferably salts which have an acid action (Lewis acids), such as magnesium chloride, iron-III chloride, zinc nitrate or boron trifluoride/diethyl ether. The conjoint use of these catalysts is especially advisable in the condensation of THPOH and when the condensation is carried out at below 120°C.

After completion of the condensation, the salts of the condensation products can also be completely or partially converted into their corresponding hydroxides, which is as a rule effected by adding strong bases such as alkali metal hydroxides or alkaline earth metal hydroxides, for example sodium hydroxide, potassium hydroxide or calcium hydroxide, or also sodium carbonate. The amount of base is appropriately so chosen that the pH value of the reaction mixture is about 5 to 8. Appropriately, the conversion is carried out in the bath used for application.

At times, the end products show an unpleasant odour caused by volatile, low molecular trivalent phosphorus compounds, for example phosphines, such as trihydroxymethylphosphine. This odour can be eliminated by an oxidative after-treatment of the condensation product, for example by passing air or oxygen into the reaction mixture or by adding oxidising agents such as hydrogen peroxide or potassium persulphate.

The condensation products are used for flameproofing fibre mixtures of polyester and cellulose. For this, an appropriate procedure is to apply to these materials an aqueous preparation which contains at least (1) a condensation product of the indicated type and (2) a polyfunctional compound which differs from the condensation products according to (1), and to finish the materials treated in this way by the moist batch, wet batch, ammonia or, preferably, thermofixing process.

The component (2) is preferably a polyfunctional epoxide or above all a polyfuncitional nitrogen compound. Possible epoxides are above all epoxides which are liquid at room temperature and have at least two epoxide groups, which are preferably derived from polyhydric phenols. Polyfunctional nitrogen compounds are, for example, polyalkylenepolyamines or especially compounds which form aminoplasts, or aminoplast precondensates. The latter are preferred.

By compounds which form aminoplasts there are understood nitrogen compounds which can be methylolated and by aminoplast precondensates there are understood addition products of formaldehyde to nitrogen compounds which can be methylolated. As compounds which form aminoplasts or as nitrogen compounds which can be methylolated, there may be mentioned:

1,3,5-aminotriazines such as N-substituted melamines, for example N-butylmelamine, N-trihalogenomethylmelamines, triazones and ammeline, guanamines, for example benzoguanamines and acetoguanamines or also diguanamines.

Further possibilities are: cyanamide, acrylamide, alkylureas or arylureas and alkylthioureas or arylthioureas, alkyleneureas or alkyldiureas, urea, thiourea, urones, ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the radical —$CH_2CH_2CO$—NH—$CH_2OH$. The methylol compounds of a urea, of an ethyleneurea or, especially, of melamine are preferentially used and valuable products are in general given by products which are as highly methylolated as possible but in particular also by products with low methylolation. Optionally etherified methylolmelamines are particularly suitable, for example dimethylolmelamine or trimethylolmelamine or mixtures thereof. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol isopropanol, n-butanol or pentanols are advantageous. It is, however, desirable that these aminoplast precondensates should be water-soluble, such as, for example, pentamethylolmelaminedimethylether or trimethylolmelamine-dimethyl-ether.

The fibre mixtures of polyester and cellulose which are to be provided with a flameproof finish are for example, mixed fabrics wherein the ratio of the polyester constituent to the cellulose constituent is 1:4 to 2:1. It is thus possible to use, for example, so-called 20/80, 26/74, 50/50 or 67/33 polyester and cellulose mixed fabrics. Wool can also be finished if desired.

The cellulose constituent of the fibre material originates, for example, from linen, cotton, rayon or staple viscose.

The aqueous preparations for flameproofing the fibre mixtures of polyester and cellulose as a rule contain 200 to 600 g/l, preferably 350 to 450 g/l, of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of substance on fabrics it is advantageous, for example, to add 0.1 to 0.5% of a high molecular polyethylene glycol. Furthermore, the customary plasticisers can be added to the preparations, for example an aqueous polyethylene emulsion or silicone oil emulsion.

To improve the mechanical strengths of the fibres it is also possible to add to the preparations suitable copolymers, for example copolymers of N-methylolacrylamide or cationic copolymers. Advantageous compositions for this purpose are, for example, aqueous emulsions of copolymers of (a) 0.25 to 10% of an alkaline earth metal salt of an $\alpha,\beta$-ethylenically unsaturated monocarboxylic acid, (b) 0.25 to 30% of a N-methylolamide or N-methylolamide-ether of an $\alpha,\beta$-ethylenically unsaturated monocarboxylic or dicarboxylic acid and (c) 99.5 to 60% of at least one other copolymerisable compound.

These copolymers and their manufacture are known. The tear strength and abrasion resistance of the treated fibre material can be favourably influenced by the conjoint use of such a copolymer.

If a polymer of the indicated type is also added to the preparation, it is advantageously added in small amounts, for example up to 10% relative to the amount of the condensation product. The same is true of any plasticiser which may be added, where the appropriate amounts can again be 1 to 10%.

It is also possible to add curing catalysts, such as, for example, ammonium chloride, ammonium dihydrogen orthophosphate, phosphoric acid, magnesium chloride or zinc nitrate, but is in most cases not necessary.

The pH value of the preparation is as a rule 2 to 7.5, preferably 4 to 7, and is adjusted in the usual manner by adding acid or base.

It can also be advantageous to add buffer substances, for example $NaHCO_3$, disodium and trisodium phosphate or triethanolamine.

To improve the durability of the flameproof finishes and to achieve a soft handle it can be advantageous to add, to the aqueous preparations, halogenated paraffins in combination with a polyvinyl halide compound.

The preparations are now applied to the fibre materials, which can be done in a manner which is in itself known. Preferably, piece goods are used, and are impregnated on a padder which is fed with the preparation at room temperature.

In the preferred thermofixing process, the fibre material impregnated in this way must now be dried and subjected to a heat treatment. Drying is appropriately carried out at temperatures of up to 100°C. Thereafter the material is subjected to a heat treatment at temperatures above 100°C, preferably 100° to 200°C, preferably 120° to 180°C, the duration of which can be the shorter the higher is the temperature. This duration of heating is, for example, 30 seconds to 10 minutes.

It is, however, also possible to use the so-called moist fixing process or wet fixing process or the ammonia fixing process.

If the moist fixing process is used, the fabric is first dried to a residual moisture of about 5 to 20% and is thereafter stored for 12 to 48 hours at about 40° to 60°C, rinsed, washed and dried. In the wet fixing process a similar procedure is followed, except that the completely wet fibre material is stored. In the ammonia fixing process, the treated fibre material is gas-treated whilst still moist and is subsequently dried.

A rinse with an acid-binding agent, preferably with aqueous sodium carbonate solution, can be appropriate in the case of a strongly acid reaction medium.

Instead of the preferred methylolated urea it is also possible, according to the invention, to use corresponding alkyl ethers.

The etherification is carried out, for example, with n-butanol, n-propanol, ethanol or especially methanol. Preferably, it takes place in an acid medium.

In the examples which follow, the percentages and parts are percentages by weight and parts by weight, respectively. The relationship of parts by volume to parts by weight is as of ml to g.

MANUFACTURING INSTRUCTIONS

A. 244 parts of a 78% strength aqueous solution of THPC (1 mol) and 60 parts of dimethylolurea (0.5 mol) are treated for 2 hours at 100° to 110°C internal temperature in a stirred vessel of 500 parts by volume capacity, equipped with a thermometer and reflux condenser.

The reaction product is in the form of a clear, colourless solution of low viscosity, which contains 76.5% of condensation product.

The infrared spectrum of this product shows the following bands:

| | | | |
|---|---|---|---|
| Broad | band at approx. | 3,240 cm$^{-1}$ | strong |
| Sharp | " | 2,910 " | weak |
| Broad shoulder | " | 2,850 " | medium- strong |
| Broad | " | 2,620 " | medium |
| Broad shoulder | " | 2,480 " | weak |
| Broad shoulder | " | 2,350 " | weak |
| Sharp | " | 2,070 " | weak |
| Broad | " | 1,645 " | strong |
| Broad | " | 1,540 " | medium |
| Broad | " | 1,400 " | medium |
| Broad shoulder | " | 1,285 " | weak |
| Broad shoulder | " | 1,260 " | weak |
| Broad shoulder | " | 1,195 " | weak |
| Sharp shoulder | " | 1,100 " | weak |
| Broad | " | 1,035 " | medium |
| Broad | " | 900 " | medium |

B. 244 parts of a 78% strength aqueous THPC solution (1 mol), 36 parts of monomethylolurea (0.4 mol)

and 200 parts of xylene isomer mixture are heated to the boil, with rapid stirring, in a stirred vessel of 500 parts by volume capacity equipped with a water separator and thermometer. At a boiling point of 102°C, the azeotropic removal of the water from the aqueous THPC solution and of the water formed by condensation (a total of 76 parts of water) commences. After removal of this amount of water, the boiling point reaches 132°C without, however, further water being formed. The mixture is cooled to 90°C, the product is dissolved by adding 200 parts of water and the xylene is largely stripped off. The aqueous solution is completely evaporated in vacuo at 70°C.

185 parts of a highly viscous condensation product are obtained. The infrared spectrum of this product shows the following bands:

| Broad shoulder | band at approx. | 3,300 cm$^{-1}$ | strong |
|---|---|---|---|
| Broad | " | 2,920 " | weak |
| Broad shoulder | " | 2,850 " | medium |
| Broad shoulder | " | 2,640 " | medium-weak |
| Broad shoulder | " | 2,340 " | weak |
| Broad | " | 2,070 " | weak |
| Broad | " | 1,630 " | strong |
| Broad | " | 1,545 " | medium |
| Broad | " | 1,400 " | medium |
| Broad | " | 1,250 " | weak |
| Broad shoulder | " | 1,195 " | weak-medium |
| Broad shoulder | " | 1,105 " | weak |
| Sharp | " | 1,040 " | strong |
| Broad | " | 900 " | weak |
| Broad | " | 750 " | weak |

C. 244 parts (1 mol) of a 78% strength aqueous solution of THPC and 120 parts (1 mol) of dimethylolurea are warmed from 25° to 95°C over the course of 15 minutes, in a stirred vessel of 500 parts by volume capacity, equipped with a reflux condenser and thermometer. At 95°C, the reaction mixture forms a colourless clear solution which is immediately cooled again to room temperature by means of ice.

Yield: 364 parts of clear, colourless solution of low viscosity.

Active substance content: 80% by weight.

The infrared spectrum of this product shows the following bands:

| Broad | band at approx. | 3,240 cm$^{-1}$ | medium-strong |
|---|---|---|---|
| Broad | " | 2,920 " | weak |
| Broad shoulder | " | 2,850 " | weak |
| Broad shoulder | " | 2,350 " | weak |
| Broad shoulder | " | 2,080 " | weak |
| Broad | " | 1,630 " | medium-strong |
| Broad | " | 1,530 " | medium |
| Broad | " | 1,400 " | weak-medium |
| Sharp shoulder | " | 1,295 " | weak |
| Broad | " | 1,255 " | weak |
| Broad shoulder | " | 1,190 " | weak |
| Broad shoulder | " | 1,165 " | weak |
| Broad shoulder | " | 1,105 " | weak |
| Broad | " | 1,035 " | medium-strong |
| Broad shoulder | " | 905 " | medium |

D. 244 parts of a 78% strength aqueous solution of THPC (1 mol) are neutralised, in a stirred vessel of 500 parts by volume capacity equipped with a thermometer and reflux condenser, to a pH value of 7.2 with 60 parts of 30% strength aqueous sodium hydroxide solution, and thereafter 24 parts of dimethylolurea (0.2 mol) are added. Condensation is then carried out for 2 hours at a constant temperature of 100°–110°C and thereafter the water is removed in vacuo at 60°C.

205 parts of a syrupy condensation product containing 26 parts of NaCl are obtained.

The infrared spectrum of this product shows the following bands:

| Broad | band at approx. | 3,240 cm$^{-1}$ | strong |
|---|---|---|---|
| Sharp | " | 2,910 " | weak |
| Broad shoulder | " | 2,850 " | medium |
| Broad shoulder | " | 2,620 " | medium |
| Broad shoulder | " | 2,360 " | weak |
| Sharp | " | 2,070 " | weak-medium |
| Broad | " | 1,595 " | strong |
| Broad | " | 1,505 " | medium-weak |
| Broad | " | 1,405 " | medium-weak |
| Sharp shoulder | " | 1,295 " | weak |
| Broad shoulder | " | 1,230 " | weak |
| Sharp shoulder | " | 1,105 " | weak |
| Broad | " | 1,040 " | weak-medium |
| Broad | " | 900 " | weak-medium |
| Sharp shoulder | " | 740 " | weak |

E. 190.5 parts (1 mol) of crystalline anhydrous THPC and 2.4 parts (0.02 mol) of dimethylolurea are condensed in the melt, at 105°C internal temperature, for 2 hours in a stirred vessel of 500 parts by volume capacity provided with a reflux condenser and thermometer. After cooling, 192 parts of a crystalline condensation product are obtained.

The infrared spectrum of this product shows the following bands:

| Broad | band at approx. | 3,240 cm$^{-1}$ | strong |
|---|---|---|---|
| Sharp | " | 2,920 " | weak |
| Broad shoulder | " | 2,850 " | medium |
| Broad shoulder | " | 2,620 " | medium |
| Broad shoulder | " | 2,350 " | weak |
| Sharp | " | 2,070 " | weak |
| Broad | " | 1,630 " | medium-strong |
| Broad | " | 1,415 " | medium-strong |
| Sharp | " | 1,295 " | weak |
| Broad | " | 1,190 " | weak |
| Sharp | " | 1,040 " | strong |
| Sharp shoulder | " | 920 " | medium-strong |
| Broad shoulder | " | 875 " | medium-weak |

F. 47 parts (0.2 mol) of tetrakis-hydroxymethylphosphonium bromide and 9.6 parts (0.08 mol) of dimethylolurea are mixed with 11.75 parts of water, and condensed for 2 hours at 100°–105°C, in a stirred vessel of 200 parts by volume capacity equipped with a thermometer and reflux condenser. After cooling to room temperature, 63 parts of a solution of the condensation product, which has a low viscosity and is yellow in colour, are obtained.

the infrared spectrum of this product shows the following bands:

| Broad | band at approx. | 3,240 cm$^{-1}$ | strong |
|---|---|---|---|
| Broad shoulder | " | 2,905 " | weak |
| Broad shoulder | " | 2,850 " | weak-medium |
| Broad shoulder | " | 2,640 " | weak |
| Broad shoulder | " | 2,340 " | weak |
| Broad shoulder | " | 2,070 " | weak |
| Broad shoulder | " | 1,715 " | medium |
| Broad | " | 1,650 " | weak-medium |
| Broad shoulder | " | 1,500 " | weak |
| Broad shoulder | " | 1,460 " | weak |
| Broad | " | 1,415 " | weak-medium |
| Sharp | " | 1,300 " | weak-medium |
| Broad | " | 1,130 " | medium |
| Broad | " | 1,040 " | weak |
| Broad | " | 980 " | weak |
| Broad | " | 925 " | weak |
| Broad | " | 875 " | weak-medium |
| Broad | " | 760 " | weak |

EXAMPLE 1

Mixed fabrics of polyester/cotton (PES/CO) (67/33) are padded with a liquor according to the following Table 1, dried at 80° to 100°C and subsequently cured for 5 minutes at 150°C.

The fabric is then washed for 5 minutes at 60°C in a liquor which contains, per litre, 5 ml of hydrogen peroxide (35% strength), 3 g of sodium hydroxide solution (30% strength) and 1 g of a 25% strength aqueous solution of a condensation product of 1 mol of p-tert-nonylphenol and 9 mols of ethylene oxide. Thereafter the fabric is rinsed and dried.

The degree of fixing indicates the amount of product present on the fibre material after rinsing (relative to the originally absorbed amount).

The fabrics are then washed up to 40 times for 45 minutes at 60°C in a domestic washing machine, in a liquor which contains 4 g/l of a domestic detergent (SNV 158,861 wash).

The individual samples of fabric are then tested for their flameproof character (DIN 53,906 vertical test; ignition time 6 seconds).

The results are summarised in Table 1 which follows.

a. By the thermofixing process, as indicated in Example 1, with subsequent washing as indicated in Example 1 (PES/CO: 60° C, W: 40° C, CO: 95° C).

b. Partly by the moist fixing or moist batch process: after padding store at 10% residual moisture for 24 hours at 50°C, then rinse with cold water, wash for 5 minutes in a bath which contains 4 g/l of sodium carbonate and 1 g/l of a condensation product of 1 mol of p-tert. nonylphenol and 9 mols of ethylene oxide, rinse and dry.

c. Partly by the ammonia fixing process: the padded fabric is dried (not completely) at 80°C, gassed with ammonia for 10 minutes, and then treated for 10 minutes in a liquor which contains 300 ml of a 24% strength aqueous ammonia solution per litre. It is then, without rinsing, washed for 10 minutes in a bath which contains 5 g/l of soap and 6 ml/l of $H_2O_2$ (35% strength) at 40°C, and then rinsed and dried.

TABLE 1

| Constituents (g/l) | Untreated | Treated with liquor A |
|---|---|---|
| Product according to Instruction A | | 545 |
| Dimethylolmelamine | | 72.5 |
| pH value of the liquor (adjusted with NaOH) | | 5.5 |
| Liquor absorption (%) | | 70 |
| Degree of fixing (%) | | 78 |
| Flameproof character | | Smouldering time (seconds) Tear length (cm) |
| After rinsing | Burns | 0 / 14 |
| After 20 washes (60°C) | Burns | 0 / 10.5 |
| After 40 washes (60°C) | Burns | 0 / 10.5 |

EXAMPLE 2

Fabrics of polyester/cotton (PES/CO), 67:33 and 50:50, wool (W) and cotton (CO) are padded with the liquors of the following Table 2, and then after-treated as follows:

The fabrics are then washed up to 20 times at 40°C (W), 60°C (PES/CO) or 95°C (CO) as indicated in Example 1 and then tested for their flameproof character according to DIN 53,906 (ignition time 6 seconds). Untreated fabrics burn away. The results are summarised in Table 2 below.

TABLE 2

| Constituents g/l | Fabrics treated with PES/CO 50:50 | | | | | | | | PES/CO 67:33 | | | | CO | | | W |
|---|---|---|---|---|---|---|---|---|---|---|---|---|---|---|---|---|
| | I | II | T III | IV | V | A VI | M VII | VIII | IX | T X | XI | XII | T XIII | A XIV | XV | T XIV |
| Product according to instruction | | | | | | | | | | | | | | | | |
| B | | | | 485 | 485 | | | | | | 485 | 485 | | | | |
| C | | | 960 | | | | 960 | | | | 960 | | | | | |
| D | | 540 | | | | | | | 540 | 540 | | | | | | 445 |
| E | 505 | | | | | 505 | | | 505 | | | | | 275 | 275 | |
| F | | | | | | | | | | | | | | | | |
| Di-trimethylolmelamine | 103 | 103 | | 103 | | 103 | 103 | 103 | 103 | 103 | | 103 | | 120 | 120 | 84 |
| Trimethylolmelamine-dimethyl-ether (75% strength) | | | 153 | | 153 | | | | | | 153 | | 153 | | | |
| Condensation product(*) | | | | | | | | | | | | | | | | |
| Silicone oil emulsion (40% strength) | 35 | 35 | 35 | 35 | 35 | 35 | 35 | 35 | 35 | 35 | 35 | 35 | 35 | 35 | 35 | 35 |
| pH value | 5.5 | 4.5 | 4.5 | 5.5 | 5.5 | 5.5 | 4.5 | 4.5 | 5.5 | 4.5 | 4.5 | 5.5 | 5.5 | 5.5 | 5.5 | 4.5 |
| Degree of fixing % | 52 | 63 | 70 | 74 | 74 | | | | 56 | 64 | 82 | 78 | 74 | 51 | | 86 |
| Liquor uptake % | 70 | 70 | 70 | 70 | 70 | 70 | 70 | 70 | 70 | 70 | 70 | 70 | 70 | 80 | 80 | 80 |
| Flameproof character: burning time (seconds) / Tear length (cm) | | | | | | | | | | | | | | | | |
| After rinsing | 0/11 | 0/9 | 0/8 | 0/8 | 0/8 | 0/7 | 0/5 | 0/7 | 0/12 | 0/10 | 0/9 | 0/12 | 0/8 | 0/11 | 0/6 | 0/.. |
| After 1 wash | 0/10 | 0/9 | 0/8 | 0/6 | 0/8 | 0/6 | 0/7 | 0/8.5 | 0/10 | 0/9.5 | 0/9.5 | 0/7.5 | 0/10 | 0/7 | 0/6 | 0/2. |
| After 5 washes | 0/8 | 0/6 | 0/6 | 0/7.5 | 0/8 | 0/6 | 0/6 | 0/9 | 0/9 | 0/11 | 0/6 | 0/9 | 0/11 | 0/8 | 0/6 | 0/2. |
| After 20 washes | 0/12 | 0/6.5 | 0/7 | 0/6 | 0/8.5 | 0/5.5 | 0/6 | 0/9 | 0/10 | 0/9 | 0/11.5 | 0/9 | 0/7 | 0/8 | 0/6 | 0/8 |

*) Condensation product of 1 mol of p-tert.nonylphenol and 9 mols of ethylene oxide
T: Thermofixing process
A: Ammonia fixing process
M: Moist fixing process

EXAMPLE 3

A polyester fabric is padded with the following liquor: 530 g/l of the product according to instruction D. 120 g/l of di-trimethylolmelamine, 35 g/l of silicone oil emulsion (40% strength). pH: 4.5. Degree of fixing: 60%. Liquor uptake: 80%.

After padding, the fabric is dried at 80° to 100°C and is subsequently cured for 5 minutes at 150°C.

the polyester fabric is then washed for 5 minutes at 40°C in a liquor which contains, per litre, 4 g of sodium carbonate and 1 g of a 25% strength aqueous solution of a condensation product of 1 mol of p-tert.-nonylphenol and 9 mols of ethylene oxide. Thereafter it is rinsed and dried.

The fabrics are then washed, as at 40°C, in a domestic washing machine, in a liquor which contains 4 g/l of a domestic detergent.

The individual fabrics are then tested for their flameproof character according to the AATCC test method 34-1969.

Result:

|  | Burning time seconds | Tear length cm |
|---|---|---|
| After rinsing | 0 | 9.5 |
| After one wash | 0 | 12 |
| Untreated fabric burns away. | | |

We claim:

1. A process for flameproofing a polyester-cellulose fiber mixture, comprising the sequential steps of treating the material with an aqueous preparation which essentially includes (1) a water-soluble condensation product obtained by condensing a tetrakis-(hydroxymethyl)-phosphonium salt or tetrakis-(hydroxymethyl)-phosphonium hydroxide at 40° to 120°C with 0.02 to 1.0 molar equivalent of monomethylolurea or dimethylolurea and (2) a polyfunctional aminoplast precondensate, and curing the treated material at a temperature in the range of 100° to 200°C after a drying step.

2. The process of claim 1, wherein tetrakis-(hydroxymethyl)-phosphonium salt, dimethylolurea and methylolmelamine as aminoplast precondensate are used and curing at 100° to 200°C occurs during 30 seconds to 10 minutes.

3. The process of claim 1, wherein the condensation product is obtained by condensing a tetrakis-(hydroxymethyl)-phosphonium salt or hydroxide with monomethylolurea or dimethylolurea in the presence of an inert organic solvent.

4. The process of claim 1, wherein the molar equivalent of the monomethylolurea or dimethylolurea is in the range of 0.2 to 1.0.

5. The process of claim 1, wherein the tetrakis-(hydroxymethyl)-phosphonium compound is a tetrakis-(hydroxymethyl)-phosphonium salt or tetrakis-(hydroxymethyl)-phosphonium hydroxide.

6. The process of claim 1, wherein monomethylolurea or dimethylolurea are made from urea and formaldehyde during the condensation.

7. The process of claim 1, wherein the aminoplast precondensate is methylolmelamine.

8. The process of claim 3, wherein the inert organic solvent includes an aromatic hydrocarbon.

9. The process of claim 4, wherein the molar equivalent is in the range of 0.3 to 0.6.

10. The process of claim 5, wherein the tetrakis-(hydroxymethyl)-phosphonium salt is a tetrakis-(hydroxymethyl)-phosphonium halide.

11. The process of claim 10, wherein the tetrakis-(hydroxymethyl)-phosphonium halide is chloride.

12. The process of claim 11, wherein monomethylolurea or dimethylolurea and the molar equivalent thereof is about 0.5 are used.

13. The process of claim 7, wherein the methylolmelamine is at least partially etherified with an alkanol of 1 to 5 carbon atoms.

14. A mixed polyester-cellulose fiber material which has been provided with a flameproofing finish by a process comprising the sequential steps of treating the material with an aqueous preparation which essentially includes (1) a water-soluble condensation product obtained by condensing a tetrakis-(hydroxymethyl)-phosphonium salt or tetrakis-(hydroxymethyl)-phosphonium hydroxide at 40 to 120°C with 0.02 to 1.0 molar equivalent of monomethylolurea or dimethylolurea and (2) a polyfunctional aminoplast precondensate, and curing the treated material at a temperature in the range of 100° to 200°C after a drying step.

15. The mixed polyester-cellulose fiber material of claim 14, wherein tetrakis-(hydroxymethyl)-phosphonium salt, dimethylolurea and methylolmelamine as aminoplast precondensate are used and curing at 100° to 200°C occurs during 30 seconds to 10 minutes.

16. The mixed polyester-cellulose fiber material of claim 15, wherein the tetrakis-(hydroxymethyl)-phosphonium salt is tetrakis-(hydroxymethyl)-phosphonium chloride and the dimethylolurea is used in a molar equivalent of about 0.5.

* * * * *